US012384384B2

(12) United States Patent
Minakuchi

(10) Patent No.: US 12,384,384 B2
(45) Date of Patent: Aug. 12, 2025

(54) GROUND CONTACT LOAD ESTIMATION DEVICE, VEHICLE CONTROL DEVICE, AND GROUND CONTACT LOAD ESTIMATION METHOD

(71) Applicant: Hitachi Astemo, Ltd., Hitachinaka (JP)

(72) Inventor: Yuichiro Minakuchi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 322 days.

(21) Appl. No.: 18/054,395

(22) Filed: Nov. 10, 2022

(65) Prior Publication Data
US 2023/0072678 A1 Mar. 9, 2023

Related U.S. Application Data

(63) Continuation of application No. PCT/JP2020/026396, filed on Jul. 6, 2020.

(30) Foreign Application Priority Data

Jun. 29, 2020 (JP) ................................ 2020-111934

(51) Int. Cl.
*B60W 40/13* (2012.01)
*B60W 40/06* (2012.01)

(52) U.S. Cl.
CPC ............ *B60W 40/13* (2013.01); *B60W 40/06* (2013.01); *B60W 2520/105* (2013.01); *B60W 2520/125* (2013.01); *B60W 2520/28* (2013.01)

(58) Field of Classification Search
CPC .............. B60W 40/13; B60W 40/06; B60W 2520/105; B60W 2520/125; B60W 2520/28
See application file for complete search history.

(56) References Cited

U.S. PATENT DOCUMENTS

| | | | | |
|---|---|---|---|---|
| 2005/0236782 A1* | 10/2005 | Kobayashi | ............. | B60G 21/06 280/6.159 |
| 2009/0120707 A1* | 5/2009 | Yoneda | ............... | B60T 8/17555 180/248 |

(Continued)

FOREIGN PATENT DOCUMENTS

| | | | | |
|---|---|---|---|---|
| CN | 113246726 B | * | 5/2022 | ............. B60K 31/00 |
| CN | 118494089 A | * | 8/2024 | |

(Continued)

OTHER PUBLICATIONS

JP-H01130020-A translation (Year: 1987).*

(Continued)

*Primary Examiner* — Kyle T Johnson
(74) *Attorney, Agent, or Firm* — Leason Ellis LLP; Edward J. Ellis; Melvin C. Garner

(57) ABSTRACT

The present invention achieves a technology that enables estimating a ground contact load in a vehicle with sufficiently high accuracy. A ground contact load estimation device according to the present invention is configured to estimate a ground contact load of a vehicle by: acquiring a wheel angular velocity, a steady load, and an inertial load of the vehicle; calculating a first gain using the steady load and the inertial load; estimating a road surface load using the first gain, a prescribed vehicle specification, and a second gain representing a hysteresis characteristic of a tire installed on the vehicle and referencing said road surface load.

14 Claims, 4 Drawing Sheets

(56) References Cited

U.S. PATENT DOCUMENTS

| | | | |
|---|---|---|---|
| 2009/0218881 A1* | 9/2009 | Aizawa | B60T 8/1766 |
| | | | 303/113.5 |
| 2012/0179352 A1* | 7/2012 | Takenaka | B62K 1/00 |
| | | | 701/99 |
| 2015/0267742 A1* | 9/2015 | Hatakeyama | B60B 27/0005 |
| | | | 384/448 |
| 2019/0025113 A1* | 1/2019 | Masago | G01G 19/03 |
| 2020/0270824 A1* | 8/2020 | Nagayama | E01C 23/01 |
| 2022/0063366 A1* | 3/2022 | Minakuchi | B60W 30/02 |
| 2022/0144279 A1* | 5/2022 | Arikere | B60T 8/1761 |
| 2022/0355856 A1* | 11/2022 | Tanaka | B62D 6/008 |
| 2023/0072678 A1* | 3/2023 | Minakuchi | B60W 40/13 |
| 2023/0286347 A1* | 9/2023 | Zhao | B60G 17/018 |
| 2023/0318501 A1* | 10/2023 | Yamamoto | H02P 23/12 |
| | | | 701/22 |

FOREIGN PATENT DOCUMENTS

| | | | | |
|---|---|---|---|---|
| JP | H01130020 A | * | 11/1987 | |
| JP | 2006131062 A | | 5/2006 | |
| RU | 2764481 C1 | * | 1/2022 | B60G 17/00 |

OTHER PUBLICATIONS

CN-113246726-B translation (Year: 2022).*
CN-118494089-A translation (Year: 2024).*
RU-2764481-C1 translation (Year: 2022).*
On board road condition monitoring system (Year: 2007).*
Road_surface_condition_identification_approach_based_on_road_characteristic_value (Year: 2014).*
The Impact of Road Roughness on the Duration of Contact Between A vehicle Wheel and Road Surface (Year: 2014).*
Vehicle parameter identification and road roughness estimation (Year: 2022).*
International Search Report mailed Sep. 24, 2020 for the corresponding International Patent Application No. PCT/JP2020/026396 (7 pages including English translation).

* cited by examiner

GROUND CONTACT LOAD ESTIMATION DEVICE, VEHICLE CONTROL DEVICE, AND GROUND CONTACT LOAD ESTIMATION METHOD

CROSS REFERENCE TO RELATED APPLICATIONS

This application is a Continuation of International Patent Application No. PCT/JP2020/026396 filed on Jul. 6, 2020, which claims the benefit of priority to Japanese Patent Application No. 2020-111934 filed on Jun. 29, 2020, the contents of all of which are incorporated herein by reference in their entireties.

FIELD OF THE INVENTION

The present invention relates to a ground contact load estimation device, a vehicle control device, and a ground contact load estimation method.

BACKGROUND OF THE INVENTION

In related art, there has been a technique for estimating a ground contact load of a wheel of a vehicle, and controlling a braking force, a driving force, and the like of the vehicle using the estimation result, thereby improving traveling stability of the vehicle. An estimation of the ground contact load is required to have sufficiently high accuracy from the viewpoint of improving the traveling stability of the vehicle. As the technique for estimating the ground contact load, there has been a technique for estimating a ground contact load from a detected vehicle state quantity based on a vehicle motion model obtained by modeling a behavior of a vehicle (for example, refer to PTL 1).

PTL 1: JP2006-131062A

SUMMARY OF THE INVENTION

However, the ground contact load also varies due to an influence of unevenness of a road surface. Therefore, in related art as described above, since the model that estimates the ground contact load is a model in which only a load change accompanied by a posture change of a vehicle body is considered, reflection of the influence on the vehicle from the road surface may be insufficient. Accordingly, there is still room for a study from the viewpoint of improving accuracy of the ground contact load of the vehicle.

An object of an aspect of the present invention is to achieve a technique capable of estimating a ground contact load in a vehicle with sufficiently high accuracy.

In order to solve the above problem, a ground contact load estimation device according to an aspect of the present invention is a ground contact load estimation device for estimating a ground contact load of a vehicle with reference to a road surface load of the vehicle. The ground contact load estimation device includes: a wheel speed sensor configured to acquire a wheel angular speed of the vehicle; and a road surface load estimation unit configured to estimate the road surface load of the vehicle by multiplying a variation in the wheel angular velocity acquired by the wheel speed sensor, a first gain representing a characteristic related to motion of the vehicle, and a second gain representing a hysteresis characteristic of a tire of the vehicle, respectively.

In order to solve the above problem, the vehicle control device according to an aspect of the present invention includes the above-described ground contact load estimation device, and is configured to control another device in the vehicle by using the ground contact load estimated by the ground contact load estimation device.

Further, in order to solve the above problem, a ground contact load estimation method according to an aspect of the present invention is a ground contact load estimation method for estimating a ground contact load of a vehicle with reference to a road surface load of the vehicle. The ground contact load estimation method includes: a step of acquiring a wheel angular velocity of the vehicle by a wheel speed sensor; and a road surface load estimating step of estimating the road surface load of the vehicle by multiplying a variation in the wheel angular velocity acquired by the wheel speed sensor, a first gain representing a characteristic related to motion of the vehicle, and a second gain representing a hysteresis characteristic of a tire of the vehicle, respectively.

According to one aspect of the present invention, a ground contact load in a vehicle can be estimated with sufficiently high accuracy.

DETAILED DESCRIPTION OF THE INVENTION

In an embodiment of the present invention, a ground contact load on a wheel of a vehicle is estimated with sufficiently high accuracy with reference to a physical quantity of the vehicle that can be acquired using a sensor that is normally used for control for increasing traveling stability of the vehicle. In the present specification, "refer to" the physical quantity is a generic term of directly or indirectly using the physical quantity, and means one or both of the direct and indirect use of the physical quantity.

In the present embodiment, the sensor may be a sensor (hereinafter, also referred to as a "general-purpose sensor") that is normally used for standard control related to traveling of the vehicle, and may not include a roll rate sensor and a pitch rate sensor. Examples of the general-purpose sensor include a longitudinal acceleration sensor that acquires longitudinal acceleration of the vehicle, a lateral acceleration sensor that acquires lateral acceleration of the vehicle, a wheel speed sensor that acquires a wheel angular velocity of the vehicle, and a turning information sensor that acquires turning information of the vehicle. Examples of the turning information sensor include a yaw rate sensor and a steering angle sensor.

In the present embodiment, examples of the physical quantity detected by the sensor include a steady load of a vehicle, an inertia load of a vehicle, a value of a longitudinal acceleration sensor, a value of a lateral acceleration sensor, a value of a wheel speed sensor, a value of a turning information sensor, a mass of a vehicle, a height of a center of gravity of a vehicle, a roll inertia moment, a pitch inertia moment, a distance between centers of gravity of front axles of a vehicle, a distance between centers of gravity of rear axles of a vehicle, a front tread length of a vehicle, and a rear tread length of a vehicle.

In the present embodiment, a road surface load means a variation in the ground contact load due to an effect of a road surface such as unevenness of the road surface. The inertia load means a variation in the ground contact load due to an effect of turning and effects of acceleration and deceleration of the vehicle. In the embodiment, the steady load is a ground contact load in 1G of the vehicle, and may be, for example, a value calculated based on a mass of the vehicle or a constant specific to the vehicle. Further, in the present embodiment, the ground contact load of the vehicle can be estimated with reference to the road surface load of the vehicle, and can be estimated by adding the road surface load of the vehicle to the steady load and the inertia load of the vehicle, for example.

Hereinafter, an embodiment of the present invention will be described in detail.

First Embodiment

[Functional Configuration of Ground Contact Load Estimation Device]

Figure 1:
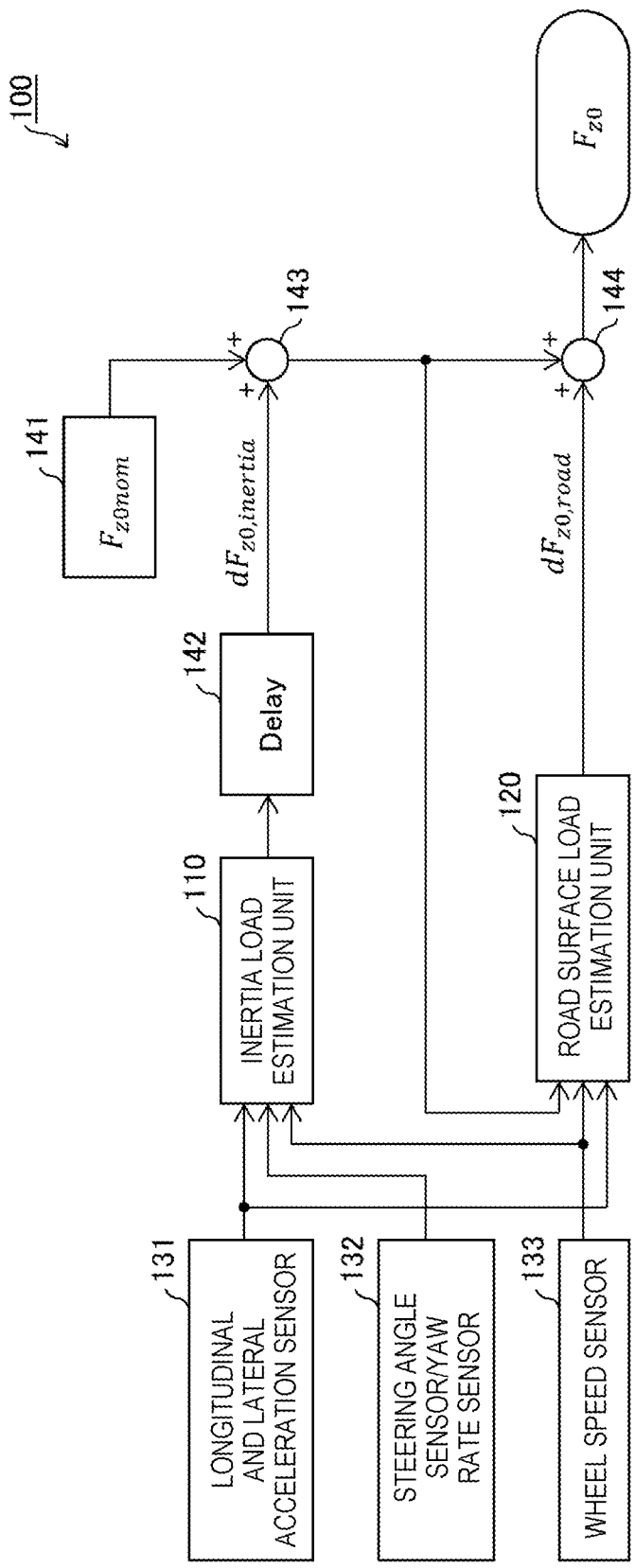
FIG. 1 is a block diagram illustrating an example of a functional configuration of a ground contact load estimation device according to an embodiment of the present invention.

FIG. 1 is a block diagram illustrating an example of a functional configuration of a ground contact load estimation device according to a first embodiment of the present invention. As illustrated in FIG. 1, a ground contact load estimation device 100 includes an inertia load estimation unit 110, a road surface load estimation unit 120, a longitudinal acceleration and lateral acceleration sensor (longitudinal and lateral acceleration sensor) 131, a steering angle sensor or a yaw rate sensor (steering angle/yaw rate sensor) 132, a wheel speed sensor 133, a steady load providing unit 141, a delay unit 142, and addition units 143 and 144.

The longitudinal and lateral acceleration sensor 131, the steering angle/yaw rate sensor 132, and the wheel speed sensor 133 are connected to the inertia load estimation unit 110. The longitudinal and lateral acceleration sensor 131 and the wheel speed sensor 133 are connected to the road surface load estimation unit 120. The longitudinal and lateral acceleration sensor 131, the steering angle/yaw rate sensor 132, and the wheel speed sensor 133 provide physical quantities relating to the vehicle to be acquired respectively by the inertia load estimation unit 110 and the road surface load estimation unit 120, and serve as acquisition units for each of the inertia load estimation unit 110 and the road surface load estimation unit 120.

The inertia load estimation unit 110 outputs a signal of a calculated inertia load. The inertia load estimation unit 110 is connected to the addition unit 143 via the delay unit 142. The steady load providing unit 141 outputs a signal of the steady load. The steady load providing unit 141 is also connected to the addition unit 143. The addition unit 143 is connected to each of the addition unit 144 and the road surface load estimation unit 120. The road surface load estimation unit 120 is connected to the addition unit 144.

Although not illustrated, the inertia load estimation unit 110 and the road surface load estimation unit 120 are connected to a network (for example, CAN to be described later) of a control system in the vehicle, and acquire physical quantities specific to the vehicle, such as a mass of the vehicle, a height of a center of gravity of the vehicle, a roll inertia moment based on a point on a road surface corresponding to the center of gravity of the vehicle, a pitch inertia moment based on the point on the road surface, a distance between centers of gravity of front axles, a distance between centers of gravity of rear axles, a front tread length, and a rear tread length, via the network. The network also corresponds to an acquisition unit in the present embodiment.

[Summary of Estimation of Ground Contact Load]

The ground contact load in the present embodiment is represented by the following Formula (1). In Formula (1), $F_{z0nom}$ represents the ground contact load in a 1G state, $dF_{z0,inertia}$ represents the inertia load, and $dF_{z0,road}$ represents the road surface load.

$$F_{z0} = F_{z0nom} + dF_{z0,inertia} + dF_{z0,road} \qquad (1)$$

The longitudinal and lateral acceleration sensor 131 detects and outputs the longitudinal acceleration and the lateral acceleration of the vehicle, the (steering angle/yaw rate sensor) 132 detects and outputs a steering angle or a yaw rate of the vehicle, and the wheel speed sensor 133 detects and outputs a wheel speed of the wheel of the vehicle. The above-described network outputs the various physical quantities related to the vehicle.

The inertia load estimation unit 110 estimates the inertia load with reference to the physical quantities. The inertia load estimation unit 110 outputs the inertia load $dF_{z0,inertia}$ to the delay unit 142. The delay unit 142 delays an output of the inertia load to an appropriate timing according to subsequent control, if necessary. For example, the delay unit 142 outputs the inertia load so as to have the same phase in accordance with a delay by movavg ($\omega$) in Formula (11) to be described later. The addition unit 143 sums the steady load $F_{z0nom}$ output from the steady load providing unit 141 and the inertia load. A total value of the steady load and the inertia load is output to the road surface load estimation unit 120 and the addition unit 144.

On the other hand, the road surface load estimation unit 120 outputs an estimated value of the road surface load with reference to a second gain to be described later. The estimation of the road surface load will be described later.

The estimated value of the road surface load output from the road surface load estimation unit 120 is summed with the total value described above in the addition unit 144. Further, a total value of the steady load, the inertia load, and the road surface load is obtained as an estimated value $F_{z0}$ of the ground contact load of the vehicle.

In the present invention, a method for estimating the inertia load is not limited. The inertia load $dF_{z0,inertia}$ may be obtained, for example, by a method described in paragraph 0042 of Japanese Patent No. 6695481 or paragraph 0024 of JP2008-074184A.

Next, the functional configuration and logic for the estimation of the road surface load in the present embodiment will be described below.

[Functional Configuration of Road Surface Load Estimation Unit]

Figure 2:
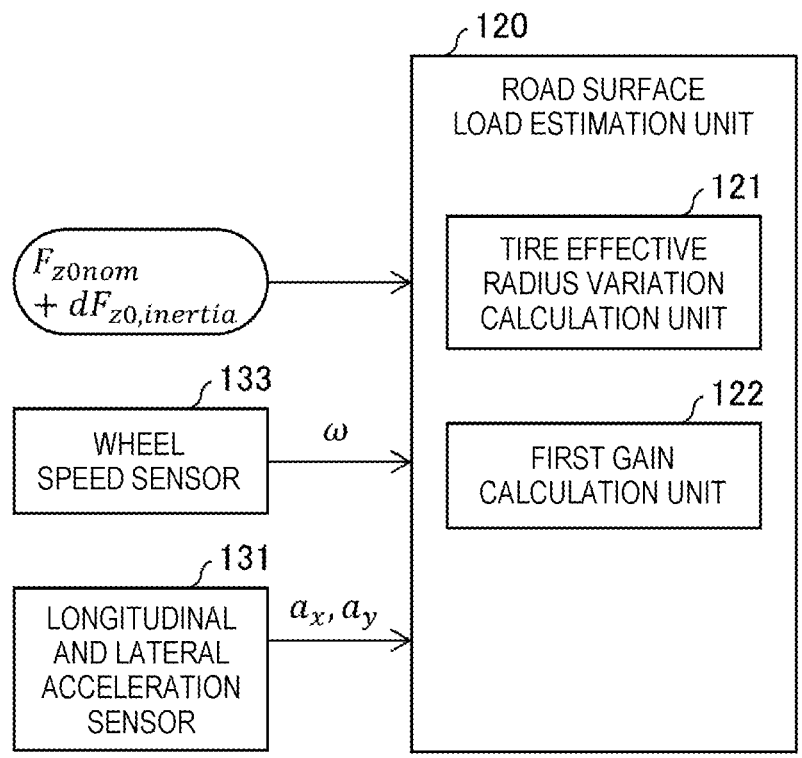
FIG. 2 is a block diagram illustrating an example of a functional configuration of a road surface load estimation unit according to the embodiment of the present invention.

FIG. 2 is a block diagram illustrating an example of a functional configuration of a road surface load estimation unit according to the present embodiment. In the present embodiment, as illustrated in FIG. 2, the road surface load estimation unit 120 includes a tire effective radius variation calculation unit 121 and a first gain calculation unit 122.

[Logic of Road Surface Load Estimation]

A nonlinear tire characteristic of the wheel of the vehicle is represented by the following Formulas (2) and (3). In Formula (3), "$F_{z0}$" is a sum of the steady load and the inertia load as shown in Formula (4).

$$dF_{z0,road} = -a_1 dR_e \quad (2)$$

$$a_1 = a_{11} F_{z0} + a_{12} \quad (3)$$

$$f_{z0} = F_{z0nom} + dF_{z0,inertia} \quad (4)$$

In the above formulas, $dR_e$ represents a tire effective radius change, $a_1$ represents a first gain, $a_{11}$ represents a first parameter, and $a_{12}$ represents a second parameter.

The first gain $a_1$ indicates rigidity of the wheel of the vehicle. The first gain $a_1$ is represented by a spring constant in a relationship of the spring constant with respect to the ground contact load of a tire. The relationship is represented by a nonlinear curve, but can be approximated to a linear expression as shown in Formula (3).

Both the first parameter $a_{11}$ and the second parameter $a_{12}$ are adjustment parameters for applying the first gain $a_1$ to a wide range of conditions. The first parameter is represented by an inclination in the linear expression obtained by the approximation described above, and the second parameter is represented by an intercept of the linear expression.

Figure 3:
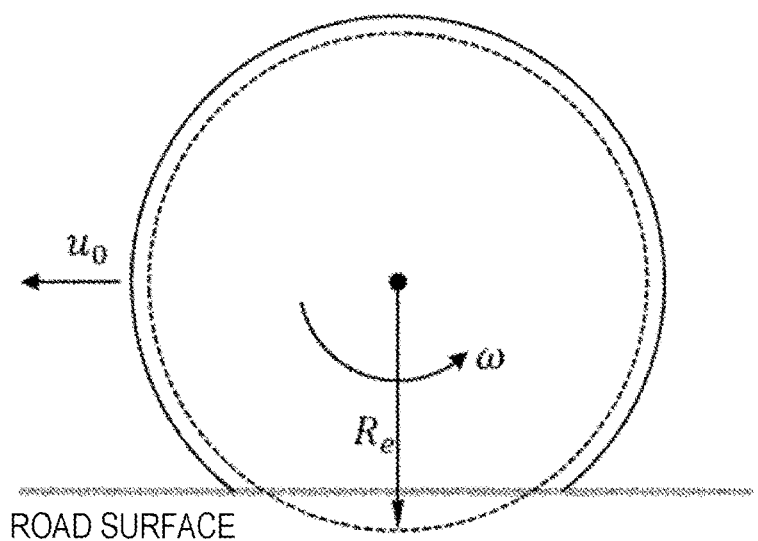
FIG. 3 is a diagram illustrating physical quantities related to a wheel of a vehicle.

FIG. 3 is a diagram illustrating the physical quantities related to the wheel of the vehicle. In FIG. 3, $R_e$ represents an effective radius of the tire, $\omega$ represents an angular velocity of the tire, and $u_0$ represents a circumferential velocity of the tire. Considering a slip ratio of the tire, the effective radius $R_e$ of the tire is represented by the following Formula (5). The following Formula (6) is derived from a total differential of Formula (5).

$$R_e = \frac{u_0}{\omega}(1+s) \quad (5)$$

$$\frac{dR_e}{R_e} = \frac{du_0}{u_0} + \frac{ds}{1+s} - \frac{d\omega}{\omega} \quad (6)$$

If it is assumed that the slip ratio does not change, Formula (7) is derived from Formula (6), and Formula (8) is further derived. In the following formula, $a_2$ represents the second gain. The second gain will be described in detail later.

$$\frac{dR_e}{R_e} = \frac{du_0}{u_0} - \frac{d\omega}{\omega} = \frac{d\omega}{\omega}\left[\frac{du_0 \times \omega}{u_0 \times d\omega} - 1\right] \quad (7)$$

$$dR_e = a_2 R_e \left(\frac{d\omega}{\omega}\right) \quad (8)$$

Values in parenthesis in Formula (8) can be approximated as shown in Formula (9). In Formula (9), "movavg ($\omega$)" represents a moving average of the angular velocity. Accordingly, Formula (10) is derived from Formula (8).

$$\frac{d\omega}{\omega} \approx \frac{\omega - movavg(\omega)}{movavg(\omega)} \quad (9)$$

$$dR_e = a_2 R_e \left(\frac{\omega - movavg(\omega)}{movavg(\omega)}\right) \quad (10)$$

When Formula (9) is substituted into Formula (2), Formula (11) is derived. The road surface load is calculated from Formula (11). Formula (11) includes movavg ($\omega$). The calculation of the road surface load is delayed (for example, 0.05 seconds) according to a time required to acquire movavg ($\omega$).

$$dF_{z0,road} = -a_1 \times a_2 \times R_e \left(\frac{\omega - movavg(\omega)}{movavg(\omega)}\right) \quad (11)$$

<Second Gain>

The second gain $a_2$ represents a transfer function model expressing a hysteresis characteristic between a variation in the wheel angular velocity and a variation in the road surface load.

When a wheel speed variation and a road surface load variation are measured from an actual vehicle traveling on the road surface having a wavy undulation, a correlation therebetween has the following characteristic.

Although there is a positive correlation, the positive correlation is present in a region having a slight width with respect to an inclination direction thereof.

As a traveling speed increases, an inclination increases.

As the traveling speed increases, the width in the inclination direction increases.

As the traveling speed increases, a length in the inclination direction increases.

As described above, the hysteresis characteristic is considered to be present between the wheel speed variation and the road surface load variation. In the present embodiment, the hysteresis characteristic between the wheel speed variation and the road surface load variation is referred to as the second gain in the estimation of the road surface load.

In the present embodiment, it is assumed that the hysteresis characteristic between the wheel speed variation and the road surface load variation is derived from a viscoelastic characteristic of the tire, and the hysteresis characteristic is expressed as the transfer function model using a generalized Maxwell model.

Figure 4:
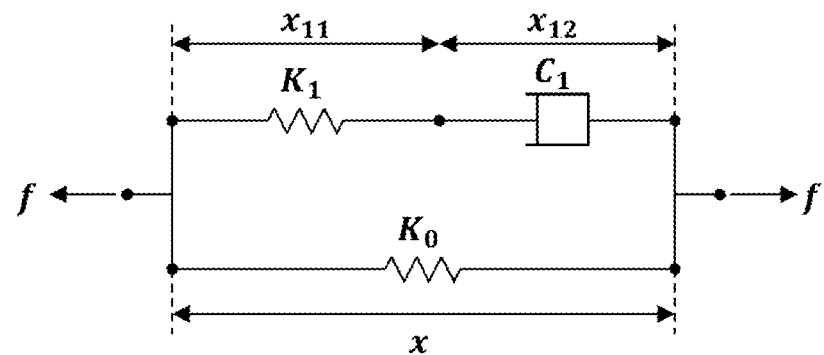
FIG. 4 is a diagram illustrating an example of a generalized Maxwell model expressing a hysteresis characteristic between a wheel speed variation and a road surface load variation derived from a viscoelastic characteristic of a tire in the embodiment of the present invention.

FIG. 4 is a diagram illustrating an example of the generalized Maxwell model expressing the hysteresis characteristic between the wheel speed variation and the road surface load variation derived from the viscoelastic characteristic of the tire. In the drawing, f represents the road surface load on the generalized Maxwell model, $K_0$ and $K_1$ represent tire spring constants, and $x_{11}$ represents spring displacement. $C_1$ represents a damping coefficient of the tire in a suspension device, and $x_{12}$ represents displacement of a tire damping system portion. Further, x represents a total value of $x_{11}$ and $x_{12}$.

In the generalized Maxwell model, when a force on a side of a spring and a damper is $f_1$ and a force in a row of only the spring is $f_0$, a resultant force of parallel elements is expressed by the following Formula (12). When Laplace transform is performed on both sides of Formula (12), Formula (13) is obtained. When each term of Formula (13) is represented by a capital letter F, the formula is represented as Formula (14). When both sides of Formula (14) are divided by X, Formula (15) is obtained. In Formula (15), X represents Laplace transform (L(x)) of x in FIG. 4.

$$f = f_0 + f_1 \quad (12)$$

$$\mathcal{L}(f) = \mathcal{L}(f_0) + \mathcal{L}(f_1) \quad (13)$$

$$F = F_0 + F_1 \quad (14)$$

$$\frac{F}{X} = \frac{F_0}{X} + \frac{F_1}{X} \quad (15)$$

With respect to $f_0$, $f_0$ is represented by Formula (16) from balance of a force with respect to $f_0$. When the Laplace transform is performed on both sides of Formula (16), the both sides are represented by Formula (17), and when each term in Formula (17) is represented by a capital letter, the formula is represented by Formula (18), and Formula (19) is derived from Formula (18).

$$f_0 = K_0 x \quad (16)$$

$$\mathcal{L}(f_0) = \mathcal{L}(K_0 x) \quad (17)$$

$$F_0 = K_0 X \quad (18)$$

$$\frac{F_0}{X} = K_0 \quad (19)$$

With respect to $f_1$, $f_1$ is represented by Formulas (20) and (21) from balance of a force with respect to $f_1$. In Formula (21), an $x_{12}$ dot represents a differential value of $x_{12}$. When the Laplace transform is performed on both sides of Formulas (20) and (21), Formulas (22) and (23) are derived, and Formulas (24) and (25) are derived by representing each term of the formulas with capital letters. Formula (26) is derived from Formulas (24) and (25), and Formula (27) is further derived.

$$f_1 = K_1 x_{11} \quad (20)$$

$$f_1 = C_1 \dot{x}_{12} \quad (21)$$

$$\mathcal{L}(f_1) = \mathcal{L}(K_1 x_{11}) \quad (22)$$

$$\mathcal{L}(f_1) = \mathcal{L}(C_1 \dot{x}_{12}) \quad (23)$$

$$F_1 = K_1 X_{11} \quad (24)$$

$$F_1 = sC_1 X_{12} \quad (25)$$

$$X = X_{11} + X_{12} = \frac{F_1}{K_1} + \frac{F_1}{sC_1} \quad (26)$$

$$\frac{F_1}{X} = \frac{sK_1 C_1}{K_1 + sC_1} \quad (27)$$

When Formulas (19) and (27) are substituted into Formula (15), Formula (28) is obtained, and when this formula is organized, the following Formula (29) is obtained. In Formula (29), $d_1$, $d_0$, $n_1$, and $n_0$ are respectively used, $d_1$ is represented by Formula (30), $d_0$ is represented by Formula (31), $n_1$ is represented by Formula (32), and $n_0$ is represented by Formula (33).

$$\frac{F}{X} = K_0 + \frac{sK_1 C_1}{K_1 + sC_1} \quad (28)$$

$$\frac{F}{X} = \frac{d_1 s + d_0}{n_1 s + n_0} \quad (29)$$

-continued $$d_1 = C_1 K_0 + C_1 K_1 \quad (30)$$

$$d_0 = K_0 K_1 \quad (31)$$

$$n_1 = C_1 \quad (32)$$

$$n_0 = K_1 \quad (33)$$

Here, in the generalized Maxwell model, f is set to correspond to the road surface load, and x is set to correspond to the following Formula (35), whereby the "hysteresis characteristic between the wheel speed variation and the road surface load variation" is represented by the following formula (34). Accordingly, a road surface load $dFz0_{road}$ is represented by Formula (36). The second gain $a_2$ is represented by Formula (37).

$$\mathcal{L}(a_{21}) = \mathcal{L}\left(dF_{z0}\bigg/\left(-a_1 \times R_e \times \frac{d\omega}{\omega}\right)\right) = \frac{d_1 s + d_0}{n_1 s + n_0} \quad (34)$$

$$x = -a_1 \times R_e \left(\frac{\omega - movavg(\omega)}{movavg(\omega)}\right)^{-1} \quad (35)$$

$$dFz0_{road} = -a_1 \times \mathcal{L}^{-1}\left(\frac{d_1 S + d_0}{n_1 S + n_0}\right) \times R_e \times \left(\frac{\omega - movavg(\omega)}{movavg(\omega)}\right) \quad (36)$$

$$a_2 = \mathcal{L}^{-1}\left(\frac{d_1 S + d_0}{n_1 S + n_0}\right) \quad (37)$$

Coefficients in a denominator and a numerator of Formula (34) can be appropriately determined by using measurement data of the actual vehicle and using an optimization method or the like.

Figure 5:
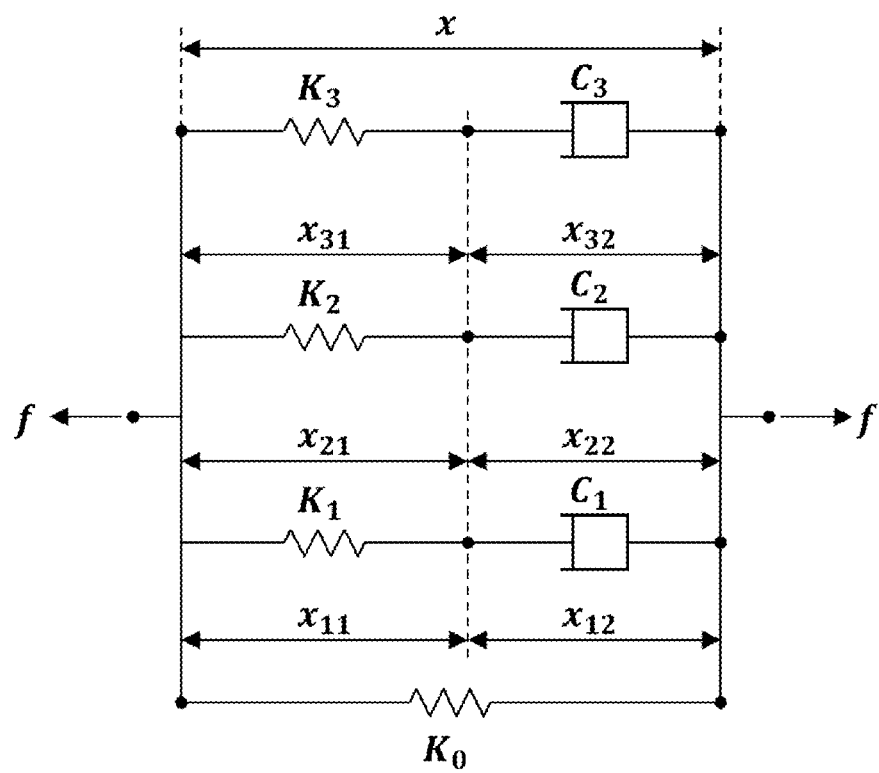
FIG. 5 is a diagram illustrating another example of the generalized Maxwell model expressing the hysteresis characteristic between the wheel speed variation and the road surface load variation derived from the viscoelastic characteristic of the tire in the embodiment of the present invention.

In the above description, a model expressing the hysteresis characteristic is derived on an assumption of a first-order model, but the model expressing the hysteresis characteristic may be derived on an assumption of a higher-order model. FIG. 5 is a diagram illustrating another example of the generalized Maxwell model expressing the hysteresis characteristic between the wheel speed variation and the road surface load variation derived from the viscoelastic characteristic of the tire. As illustrated in FIG. 5, the model expressing the hysteresis characteristic may be derived on an assumption of a higher-order (third-order) model. In this case, similarly to the first-order model, it is possible to derive the model expressing the hysteresis characteristic by combining models obtained by the resultant force of the parallel elements. A use of such a higher-order model is advantageous from the viewpoint of obtaining a more accurate estimation result of the road surface load variation.

[Estimation of Road Surface Load]

In the road surface load estimation unit 120, the first gain calculation unit 122 calculates the first gain $a_1$ using at least the steady load and the inertia load (see FIG. 2). The road surface load estimation unit 120 acquires a total value of an estimated value of the inertia load obtained by the inertia load estimation unit 110 and the steady load output from the steady load providing unit 141. The first gain $a_1$ is represented by the rigidity (spring constant) of the wheel (tire) of the vehicle as described above, and can be represented by the linear expression approximate to the nonlinear curve of the spring constant with respect to the ground contact load. Here, the ground contact load is the total value of the steady load and the inertia load. The first gain calculation unit 122 calculates the first gain by substituting the total value into Formula (3).

The tire effective radius variation calculation unit 121 multiplies the variation of the wheel angular velocity by the second gain. The variation of the wheel angular velocity is a numerical value including a variation value dω) of the wheel angular velocity ω, and is, for example, dω/ω in Formula (8). Specifically, the tire effective radius variation calculation unit 121 calculates a tire effective radius variation based on Formula (10).

The road surface load estimation unit 120 refers to calculation results of the first gain calculation unit 122 and the tire effective radius variation calculation unit 121 and the second gain described above, and calculates the road surface load based on, for example, Formula (11) described above. As described above, the road surface load estimation unit 120 estimates the road surface load of the vehicle by multiplying the variation in the wheel angular velocity acquired by the wheel speed sensor, the first gain representing a characteristic related to motion of the vehicle, and the second gain representing the hysteresis characteristic of the tire of the vehicle, respectively.

[Estimation of Ground Contact Load]

The inertia load estimation unit 110 outputs the inertia load $dF_{z0,inertia}$ to the delay unit 142 (see FIG. 1). The delay unit 142 delays the output of the inertia load to the appropriate timing according to the subsequent control, if necessary. For example, the delay unit 142 outputs the inertia load so as to have the same phase in accordance with the delay by movavg (ω) in Formula (11) described above. The addition unit 143 adds the steady load $F_{z0nom}$ output from the steady load providing unit 141 and the inertia load. The total value of the steady load and the inertia load is output to the road surface load estimation unit 120 and the addition unit 144.

On the other hand, the road surface load estimation unit 120 outputs the estimated value of the road surface load. The estimated value of the road surface load is obtained with reference to the steady load and the inertia load.

The estimated value of the road surface load output from the road surface load estimation unit 120 is added to the total value described above in the addition unit 144. In this way, the total value of the steady load, the inertia load, and the road surface load is obtained as the estimated value $F_{z0}$ of the ground contact load of the vehicle.

According to the present embodiment, when the vehicle is driven under a predetermined condition, the estimated value that substantially matches an actual measurement value of the ground contact load is obtained. As described above, in the present embodiment, the ground contact load can be estimated with higher accuracy than in a case where the second gain is a constant gain.

In the present embodiment, since the road surface load is estimated using the second gain indicating the hysteresis characteristic described above, it is possible to estimate the road surface load while sufficiently reflecting an influence of the unevenness of the road surface. Further, since the ground contact load is estimated with reference to such a road surface load, the ground contact load in the vehicle can be estimated with sufficiently high accuracy. In the present embodiment, such a highly accurate ground contact load can also be estimated by simpler control.

In the present embodiment, in the estimation of the road surface load, the steady load and the estimated inertia load are referred to. Therefore, the road surface load can be estimated with higher accuracy than in a case where the steady load and the estimated inertia load are not referred to.

Further, in the present embodiment, a reference inertia load is calculated using a physical quantity that can be acquired by the general-purpose sensor, and an inertia load correction value is calculated. Accordingly, a cost of the sensor can be reduced.

Second Embodiment: Embodiment of Control Device for Suspension Device

An example in which the above-described ground contact load estimation device is applied to a control device that controls a suspension device in the vehicle will be described below. For convenience of a description, members having the same functions as those described in the above embodiment are denoted by the same reference numerals, and description thereof will not be repeated.

The control device according to the present embodiment estimates the ground contact load acting on the vehicle including the suspension device, and controls a damping force of the suspension device in accordance with the ground contact load. The control device may be configured in the same manner as a known control device in the suspension device, except that the control device includes the above-described ground contact load estimation device and controls the damping force of the suspension device in accordance with the ground contact load estimated by the ground contact load estimation device.

Figure 6:
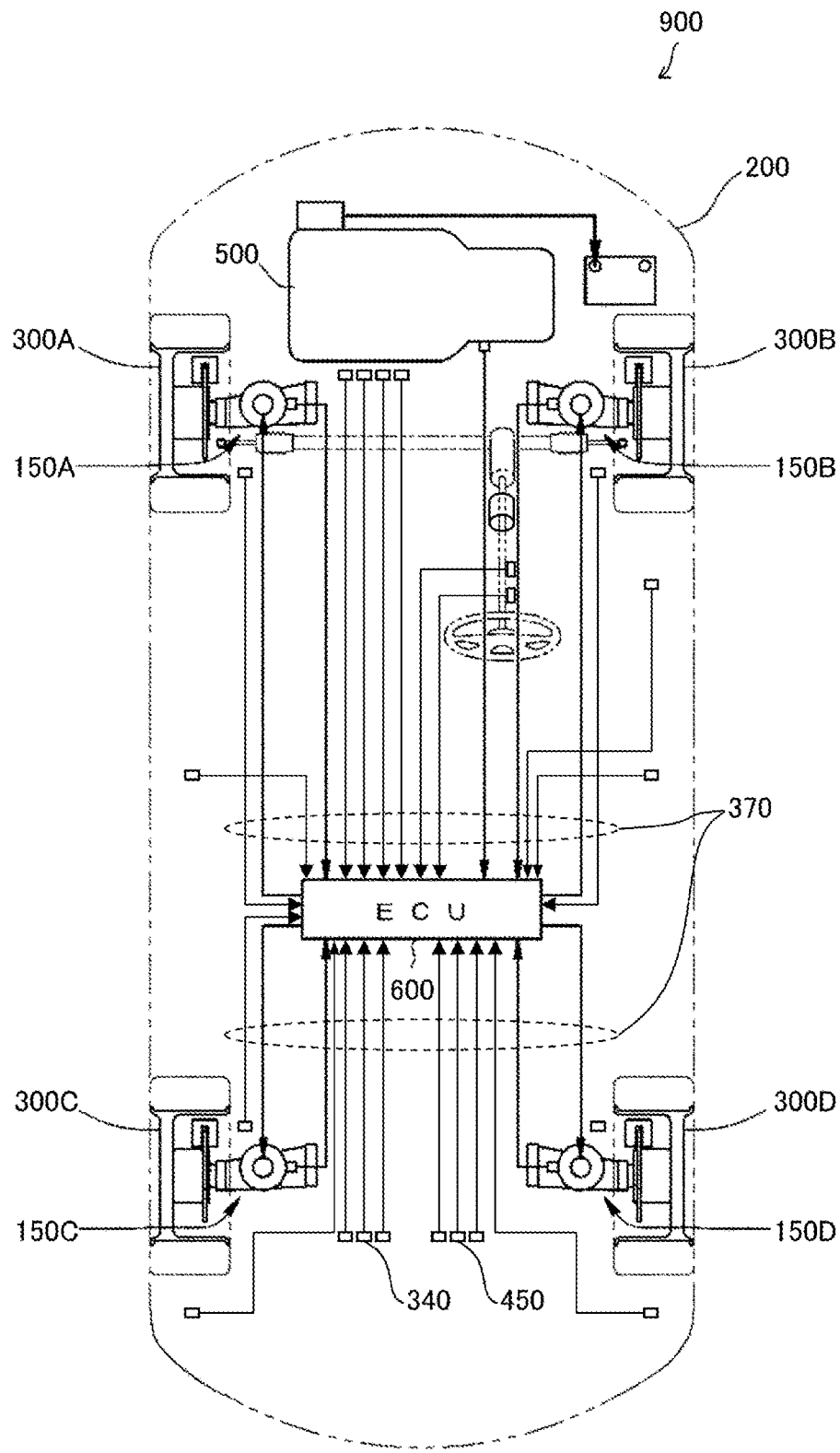
FIG. 6 is a diagram schematically illustrating an example of a configuration of the vehicle to which the ground contact load estimation device according to the embodiment of the present invention is applied.

FIG. 6 is a diagram schematically illustrating an example of a configuration of the vehicle including the above-described ground contact load estimation device. As illustrated in FIG. 6, a vehicle 900 includes a suspension device (suspension) 150, a vehicle body 200, wheels 300, a vehicle speed sensor 450 that detects a vehicle speed (V), an engine 500, and an electronic control unit (ECU) 600. The ECU 600 corresponds to the above-described processor, and includes the above-described ground contact load estimation device.

Alphabets A to D in the reference numerals represent positions in the vehicle 900, respectively. A represents a left front position of the vehicle 900, B represents a right front position of the vehicle 900, C represents a left rear position of the vehicle 900, and D represents a right rear position of the vehicle 900.

The vehicle 900 includes various sensors such as a longitudinal acceleration sensor 340 that detects acceleration of the vehicle 900 in a longitudinal direction. The sensor corresponds to the above-described general-purpose sensor. The vehicle 900 includes a storage medium. The storage medium stores various information required for estimation of a physical quantity. Examples of the information include various physical quantities related to the vehicle, such as a wheel radius and a vehicle mass (vehicle weight).

Supply of output values of the various sensors to the ECU 600 and transmission of control signals from the ECU 600 to respective units are performed via a controller area network (CAN) 370. Each sensor may be newly provided for estimation of a physical quantity to be described later, but is preferably an existing sensor in the vehicle 900 from the viewpoint of cost.

According to the present embodiment, a damping force of the suspension device is controlled based on an estimated value having the same accuracy as an actual measurement value for the ground contact load of the vehicle. Accordingly, traveling stability of the vehicle can be sufficiently improved without using a special sensor other than the general-purpose sensor.

In the present embodiment, the damping force of the suspension device of the vehicle is controlled by directly using the ground contact load estimated by the control device. In the present invention, similarly to the suspension device, the estimated ground contact load can be used for controlling various devices in the vehicle. Examples of such devices include an electronically controlled suspension, a steering device, and an electronically controlled driving force transmission device in addition to a normal suspension device. The estimated ground contact load can be used for controlling one or more of these devices in the vehicle.

In the control of these devices, an estimation result of the ground contact load may be used directly or indirectly for the control of the devices as in the present embodiment. An indirect use in the estimation result of the ground contact load means, for example, converting to another state quantity and using an estimated value of the state quantity after the conversion for the control of the other device. By using the estimated value of the ground contact load described above in the control of the other device described above, it is possible to sufficiently or further improve the traveling stability of the vehicle without using the special sensor other than the general-purpose sensor, as in the present embodiment.

[Implementation Example by Software]

A control block (particularly, the inertia load estimation unit 110 and the road surface load estimation unit 120) of the ground contact load estimation device 100 may be achieved by a logic circuit (hardware) formed in an integrated circuit (IC chip) or the like, or may be achieved by software.

In the latter case, the ground contact load estimation device 100 includes a computer that executes an instruction of a program that is software implementing each function. The computer includes, for example, one or more processors and a computer-readable recording medium storing the program. Further, in the computer, the processor reads the program from the recording medium and executes the program, thereby achieving an object of the present invention. As the processor, for example, a central processing unit (CPU) can be used.

Examples of the recording medium include "a non-transitory tangible medium" such as a read only memory (ROM), a tape, a disk, a card, a semiconductor memory, and a programmable logic circuit. A random access memory (RAM) or the like in which the program is deployed may be further provided.

The program may be supplied to the computer via any transmission medium (such as a communication network or a broadcast wave) capable of transmitting the program. An aspect of the present invention can also be implemented in a form of a data signal in which the program is embodied by electronic transmission and which is embedded in a carrier wave.

[Modification]

The present invention is not limited to the above-described embodiments, and various modifications can be made within the scope of the claims. Embodiments obtained by appropriately combining technical means disclosed in different embodiments are also included in the technical scope of the present invention. The functional configuration that estimates the ground contact load in the above-described embodiment may be appropriately simplified in accordance with desired accuracy.

For example, in the present invention, the inertia load of the vehicle may be acquired by another known technique instead of the inertia load estimation unit described above. In the present invention, instead of the first gain calculation unit described above, the first gain or another physical quantity of the vehicle substantially including the first gain may be acquired by another known technique.

In the present invention, a hysteresis characteristic other than the hysteresis characteristic between the variation in the wheel angular velocity and the variation in the road surface load due to the viscoelastic characteristic of the tire may be adopted in a range in which the hysteresis characteristic of the tire of the vehicle represented by the second gain can be obtained. In this case, a part of the above-described functional configuration of the road surface load estimation unit may be appropriately changed so as to adapt to the adopted characteristic.

Further, in the present invention, the hysteresis characteristic may be represented by an appropriate expression other than the transfer function model. In this case, a part of the above-described functional configuration of the road surface load estimation unit may be appropriately changed so as to adapt to the adopted expression.

SUMMARY

As is clear from the above description, a ground contact load estimation device (100) according to the embodiment of the present invention is a ground contact load estimation device configured to estimate a ground contact load of a vehicle (900) with reference to a road surface load of the vehicle, and includes: a wheel speed sensor (133) configured to acquire a wheel angular velocity of the vehicle; and a road surface load estimation unit (120) configured to estimate the road surface load of the vehicle by multiplying a variation in the wheel angular velocity acquired by the wheel speed sensor, a first gain representing a characteristic related to motion of the vehicle, and a second gain representing a hysteresis characteristic of a tire of the vehicle, respectively. According to this configuration, the ground contact load in the vehicle can be estimated with sufficiently high accuracy that is closer to an actual measurement.

In the present embodiment, the ground contact load estimation device may further include an inertia load estimation unit (110) configured to estimate an inertia load that is a ground contact load variation due to inertial motion of the vehicle, and the road surface load estimation unit may further include a first gain calculation unit (122) configured to calculate the first gain using the inertia load estimated by the inertia load estimation unit. This configuration is more effective from the viewpoint of improving estimation accuracy of the ground contact load.

In the embodiment of the present invention, the hysteresis characteristic of the tire in the vehicle represented by the second gain may be a hysteresis characteristic between the variation in the wheel angular velocity and a variation in the road surface load due to a viscoelastic characteristic of the tire of the vehicle. This configuration is more effective from the viewpoint of improving the estimation accuracy of the ground contact load.

In the embodiment of the present invention, the second gain may be represented by a transfer function model expressing the hysteresis characteristic. This configuration is more effective from the viewpoint of increasing the estimation accuracy of the ground contact load and reducing a load of estimation control.

The vehicle control device according to the embodiment of the present invention includes the above-described ground contact load estimation device, and controls another device in the vehicle by using the ground contact load estimated by the ground contact load estimation device.

According to this configuration, the ground contact load in the vehicle can be estimated with sufficiently high accuracy that is closer to the actual measurement, and the vehicle can be precisely controlled in a desired state.

A ground contact load estimation method according to an embodiment of the present invention is a ground contact load estimation method for estimating a ground contact load of a vehicle with reference to a road surface load of the vehicle, and includes: a step of acquiring a wheel angular velocity of the vehicle by a wheel speed sensor; and a road surface load estimating step of estimating the road surface load of the vehicle by multiplying a variation in the wheel angular velocity acquired by the wheel speed sensor, a first gain representing a characteristic related to motion of the vehicle, and a second gain representing a hysteresis characteristic of a tire of the vehicle, respectively. According to these configurations, the ground contact load in the vehicle can be estimated with sufficiently high accuracy that is closer to the actual measurement.

What is claimed is:

1. A road surface load estimation device for estimating a road surface load which is a variation in a ground contact load of a vehicle due to an effect of a road surface, the road surface load estimation device comprising:
   a wheel speed sensor configured to acquire a wheel angular velocity of the vehicle; and
   at least one processor configured to estimate the road surface load of the vehicle by multiplying a variation in the wheel angular velocity acquired by the wheel speed sensor, a first gain indicating rigidity of a wheel of the vehicle, and a second gain indicating a hysteresis characteristic between the variation in the wheel angular velocity and the road surface load, respectively, and to control a damping force generated in a suspension of the vehicle based on the estimated road surface load.

2. The road surface load estimation device according to claim 1, wherein
   the rigidity is represented by a spring constant in a relationship of the spring constant with respect to the ground contact load of a tire of the wheel.

3. The road surface load estimation device according to claim 2, wherein
   the hysteresis characteristic of the vehicle represented by the second gain is a hysteresis characteristic between the variation in the wheel angular velocity and the road surface load due to a viscoelastic characteristic of the tire of the vehicle.

4. The road surface load estimation device according to claim 3, wherein
   the second gain is represented by a transfer function model expressing the hysteresis characteristic.

5. A vehicle control device comprising:
   the at least one processor according to claim 4, wherein the at least one processor is configured to further control one or more devices selected from the group consisting of a suspension device, an electronically controlled suspension, a steering device, and an electronically controlled driving force transmission device in the vehicle based on the estimated road surface load.

6. A vehicle control device comprising:
   the at least one processor according to claim 3, wherein the at least one processor is configured to further control one or more devices selected from the group consisting of an electronically controlled suspension, a steering device, and an electronically controlled driving force transmission device in the vehicle based on the estimated road surface load.

7. A vehicle control device comprising:
   the at least one processor according to claim 2, wherein the at least one processor is configured to further control one or more devices selected from the group consisting of an electronically controlled suspension, a steering device, and an electronically controlled driving force transmission device in the vehicle based on the estimated road surface load.

8. The road surface load estimation device according to claim 1, wherein
   the hysteresis characteristic of the vehicle represented by the second gain is a hysteresis characteristic between the variation in the wheel angular velocity and the road surface load due to a viscoelastic characteristic of a tire of the vehicle.

9. The road surface load estimation device according to claim 8, wherein
   the second gain is represented by a transfer function model expressing the hysteresis characteristic.

10. A vehicle control device comprising:
    the at least one processor according to claim 9, wherein the at least one processor is configured to further control one or more devices selected from the group consisting of an electronically controlled suspension, a steering device, and an electronically controlled driving force transmission device in the vehicle based on the estimated road surface load.

11. A vehicle control device comprising:
    the at least one processor according to claim 8, wherein the at least one processor is configured to further control one or more devices selected from the group consisting of an electronically controlled suspension, a steering device, and an electronically controlled driving force transmission device in the vehicle based on the estimated road surface load.

12. A vehicle control device comprising:
    the at least one processor according to claim 1, wherein the at least one processor is configured to further control one or more devices selected from the group consisting of an electronically controlled suspension, a steering device, and an electronically controlled driving force transmission device in the vehicle based on the estimated road surface load.

13. The road surface load estimation device according to claim 1,
    wherein the at least one processor is configured to estimate an inertia load that is the variation in the ground contact load due to inertial motion of the vehicle, and
    wherein the at least one processor is configured to calculate the first gain by using a linear expression of the inertia load.

14. A road surface load estimation method for estimating a road surface load that is a variation in a ground contact load of a vehicle due to an effect of a road surface, the road surface load estimation method comprising the steps of:
    acquiring a wheel angular velocity of the vehicle by a wheel speed sensor;
    estimating the road surface load of the vehicle by multiplying a variation in the wheel angular velocity acquired by the wheel speed sensor, a first gain indicating rigidity of a wheel of the vehicle, and a second gain indicating a hysteresis characteristic between the variation in the wheel angular velocity and the road surface load, respectively; and controlling a damping force generated in a suspension of the vehicle based on the estimated road surface load.

* * * * *